Jan. 13, 1959 R. B. TROUSDALE 2,868,881

ELECTRONIC TELEPHONE SYSTEM

Filed May 10, 1955 5 Sheets-Sheet 1

FIG. I

INVENTOR.
ROBERT B. TROUSDALE
BY F. H. Henson
AGENT

Jan. 13, 1959 R. B. TROUSDALE 2,868,881

ELECTRONIC TELEPHONE SYSTEM

Filed May 10, 1955 5 Sheets-Sheet 2

INVENTOR.
ROBERT B. TROUSDALE
BY F. H. Henson
AGENT

Jan. 13, 1959 R. B. TROUSDALE 2,868,881

ELECTRONIC TELEPHONE SYSTEM

Filed May 10, 1955 5 Sheets-Sheet 3

INVENTOR.
ROBERT B. TROUSDALE
BY F. H. Henson
AGENT

INVENTOR.
ROBERT B. TROUSDALE
BY F. H. Henson
AGENT

LINK REPEATER 20A

BASE BISTABLE CHARACTERISTIC

INVENTOR.
ROBERT B. TROUSDALE
BY F. H. Henson
AGENT

United States Patent Office 2,868,881

Patented Jan. 13, 1959

2,868,881

ELECTRONIC TELEPHONE SYSTEM

Robert B. Trousdale, Webster, N. Y., assignor, by mesne assignments, to General Dynamics Corporation, a corporation of Delaware Application May 10, 1955, Serial No. 507,321

12 Claims. (Cl. 179—15)

This invention relates in general to electronic telephone systems, and more particularly to talking paths for use in electronic bi-path telephone systems. A system of this type is shown and described in Trousdale Patent 2,830,120, which is assigned to the same assignee as the present invention.

In the system disclosed in the above identified patent, the talking path comprises a multiwinding speech transmission transformer associated with each line circuit and diode switches connected between each winding of the transformer and a multiple point for each link. The assigned link, which is controlled on a time division multiplex basis, selectively renders the diode switches associated with its calling and called lines conductive so that speech current can pass between the calling and called lines through the conducting diode switches and the link multiple point.

Thus, each line circuit speech transmission transformer must have a secondary winding for each link in addition to a primary winding for furnishing battery feed to the calling line. For a 100 line system, between ten and fifteen links are required; the exact number depending upon traffic conditions. This arrangement has the disadvantage of being rather expensive because of the number of multiwinding transformers required. Also, the design of the multiwinding transformer is complicated by the fact that the transformer is required to carry D.-C. battery feed current.

Accordingly, it is the general object of this invention to provide a new and improved electronic telephone system.

It is a more particular object of this invention to provide a new and improved talking path for a bi-path electronic telephone system.

In accordance with the present invention, the multiwinding speech transmission transformer is associated with the link and has an individual winding for each line circuit of the system. A diode switch or line connecting means is interposed in the connection between the single secondary winding of the line circuit transformer and the individual winding associated with that line on each link speech transmission transformer. Thus, fewer multiwinding transformers are required and the transformer may have an interleaved core since it is not required to carry D.-C. current.

A particular advantage of the invention is that a negative impedance repeater may be connected across one winding of the link transformer and thus be shared by all lines of the system. In a 100 line system with fifteen links, only fifteen negative impedance repeaters are required to amplify and repeat speech current for all 100 lines and fifteen links. When multiwinding line circuit transformers are used, it is necessary to supply one hundred negative impedance repeaters to perform the same function.

Further objects and advantages of the invention will become apparent as the description proceeds, and the features of novelty which characterize the invention will be pointed out in particularity in the claims annexed to and forming a part of this specification.

For a better understanding of the invention, reference may be had to the drawings in which:

Figs. 1 and 2, when arranged with Fig. 2 to the right of Fig. 1, show the trunking diagram of a telephone system;

Figure 3:
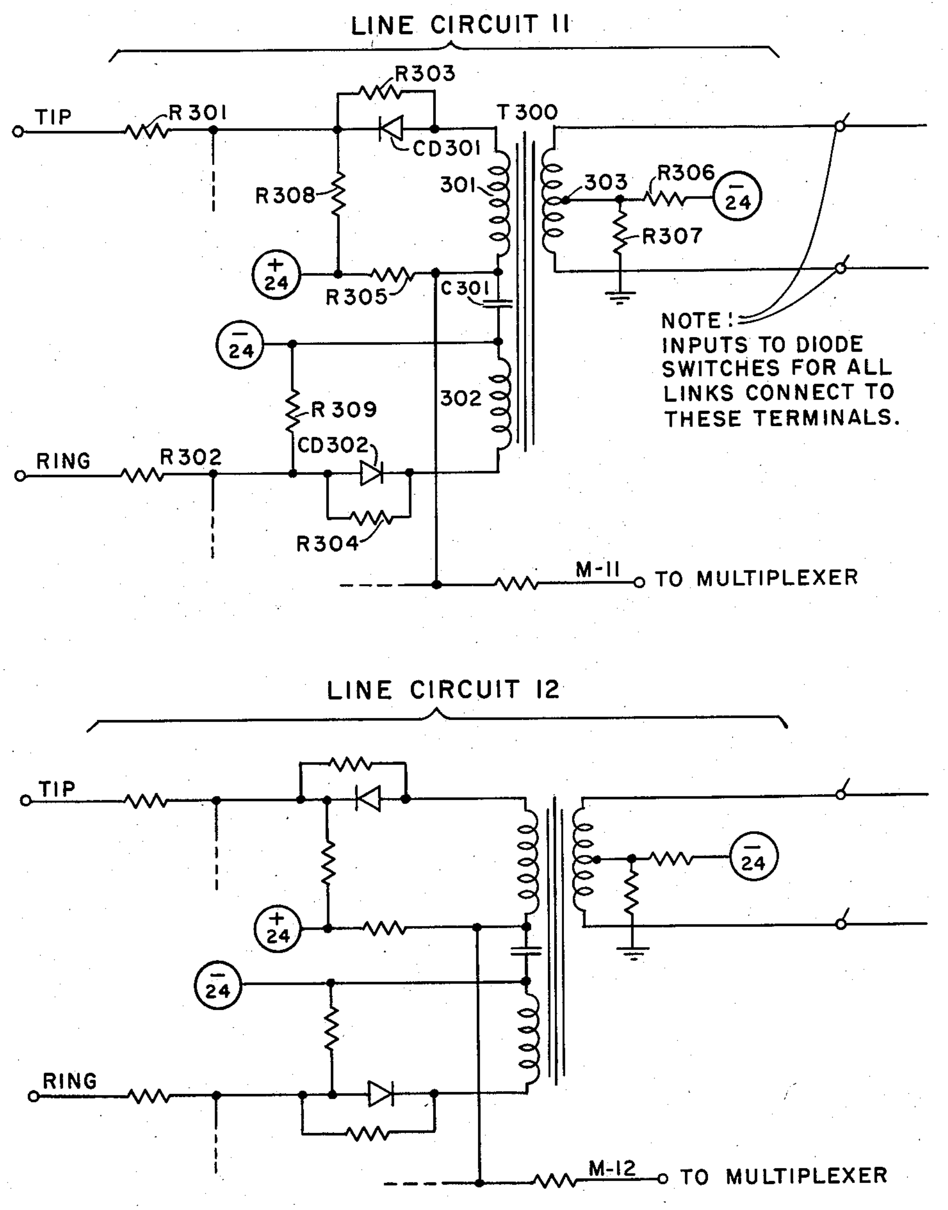
Fig. 3 shows circuit details of portions of line circuits used in a telephone system.
Figure 4:
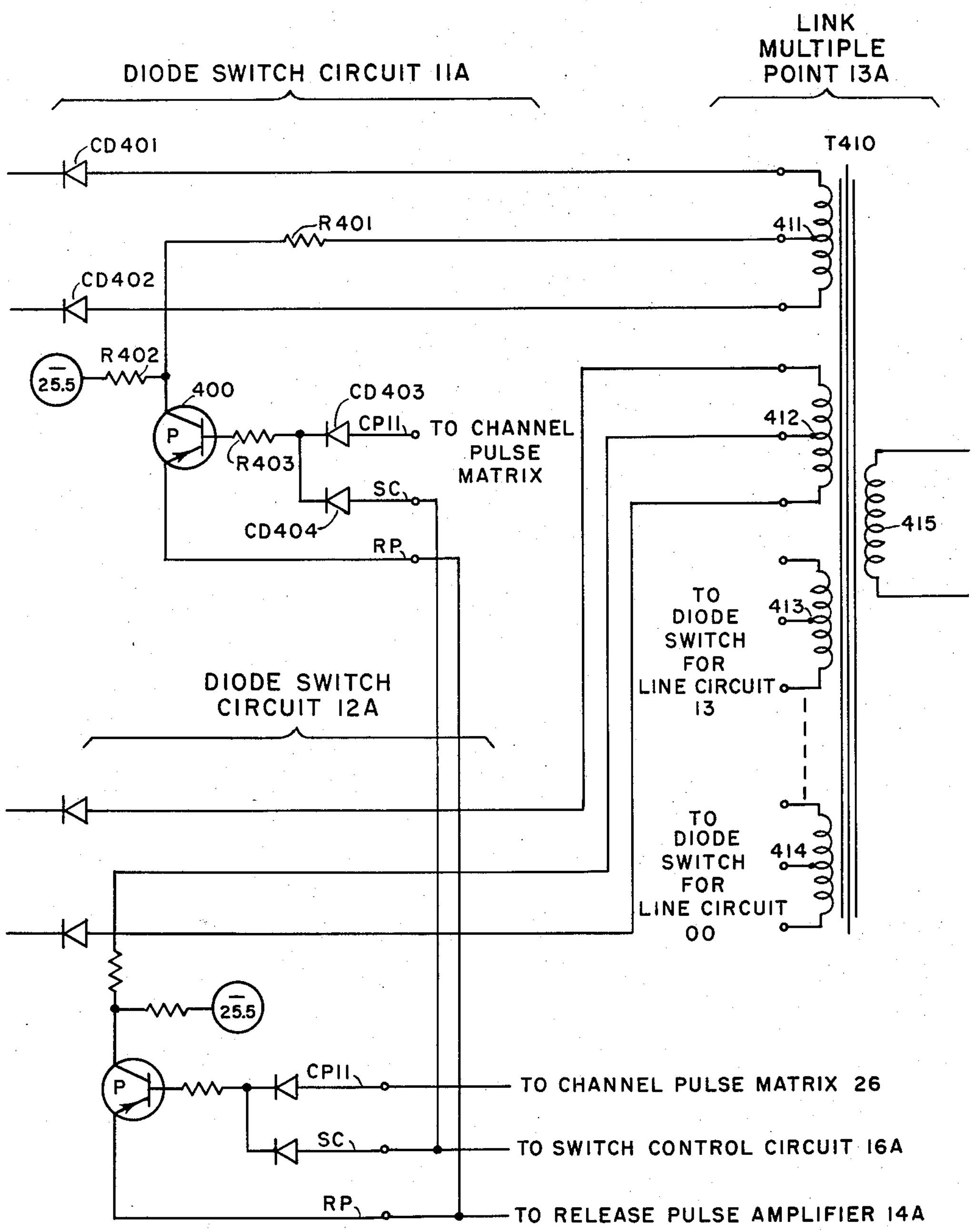
Fig. 4 shows details of diode switch circuits and a link multiple point or speech transmission transformer.
Figure 5:
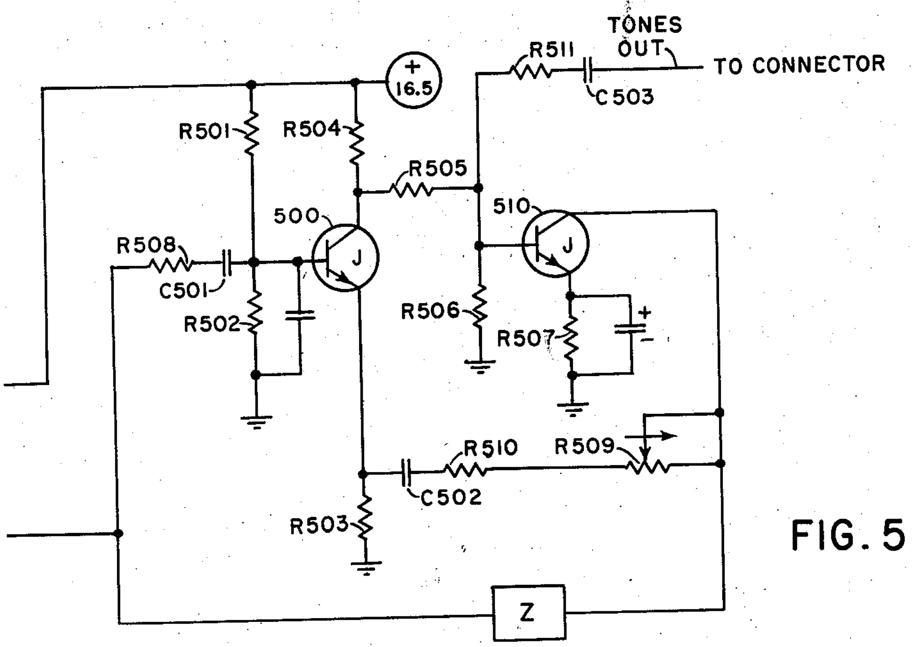
Fig. 5 shows circuit details of a link repeater.

Figures 3, 4, and 5 are to be arranged in numerical order from left to right.

GENERAL DESCRIPTION

Figure 1:
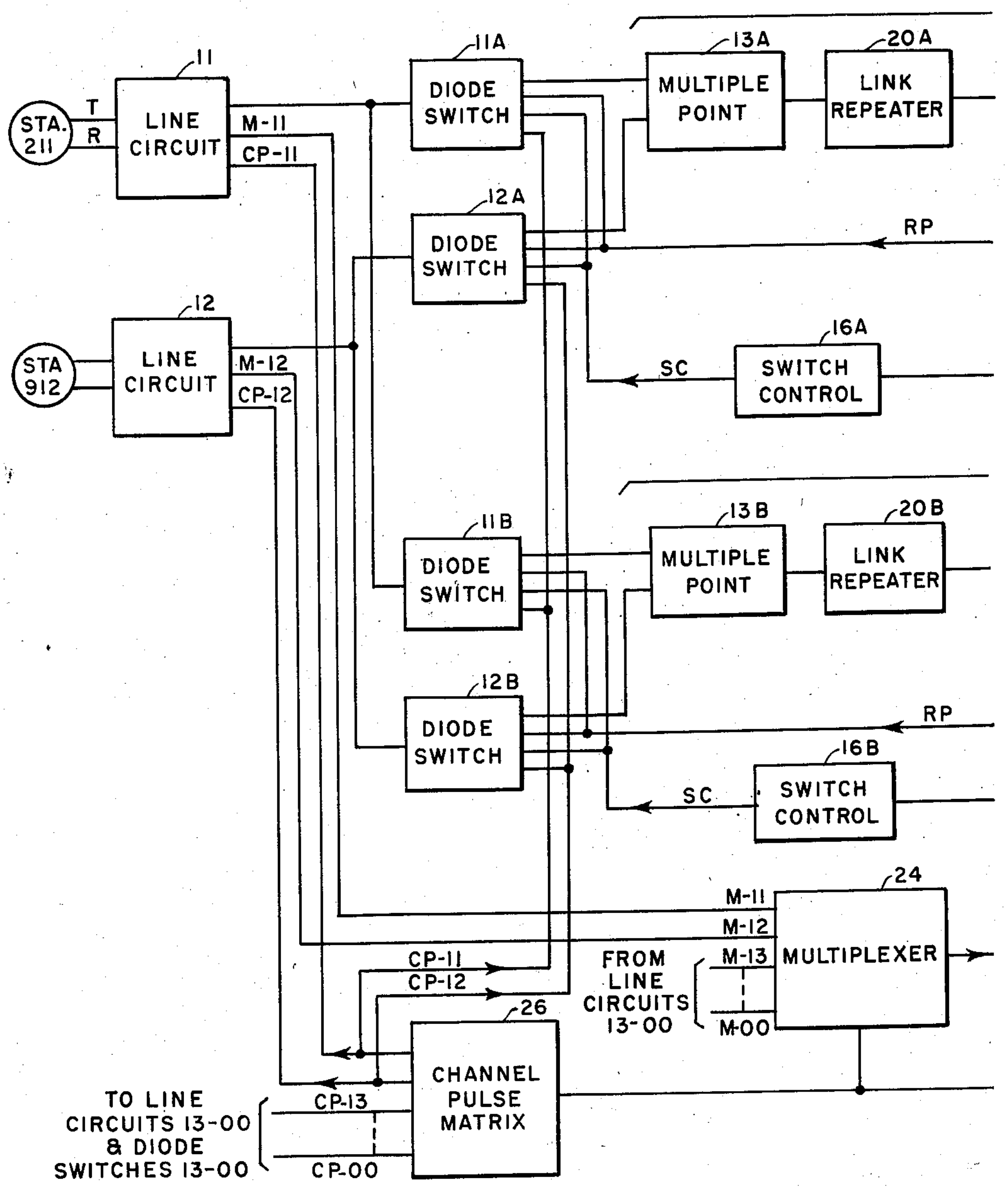
Figure 2:
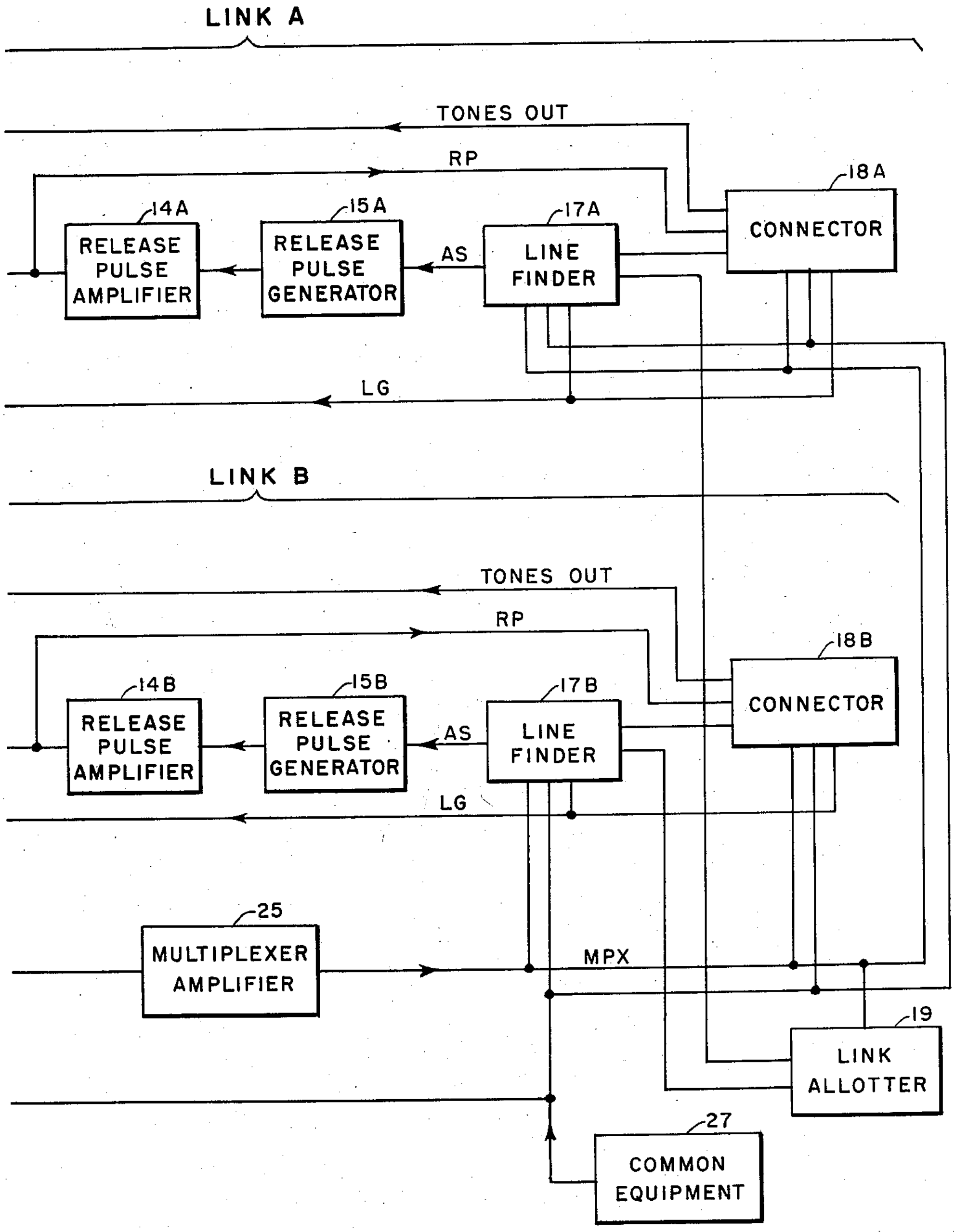

The general operation of the system can best be understood by reference to the trunking diagram shown in Figures 1 and 2. The individual circuits of the system shown in Figs. 1 and 2 have been given reference numerals which are identical to those given to the corresponding circuits in the above identified patent. To simplify the disclosure of this application, circuits other than those included in the talking path have not been shown in detail. These circuits are all shown and described in detail in the above identified patent.

The system has been illustrated as comprising two lines, namely, the lines associated with line circuits 11 and 12, and two links, namely, links A and B. Link A is identical to link B and comprises line finder 17A, connector 18A, and associated link equipment comprising link multiple point circuit 13A, release pulse generator 15A, release pulse amplifier 14A, switch control circuit 16A, and link repeater 20A.

It is to be understood, of course, that in practice there would be up to 100 line circuits, identical to line circuits 11 and 12, associated with each group of links. The number of links required for each 100 line circuit is, of course, dictated by traffic conditions. Although the trunking diagram shows just links A and B, from ten to fifteen links would normally be required to handle the traffic for each 100 line group.

As illustrated, the line circuits 11 and 12 terminate lines extending from the associated substations STA211 and STA912, respectively. Each of the line circuits terminates in a plurality of line connecting means or diode switches, one for each line finder-connector link of the system. As illustrated, line circuit 11 is connected to diode switch 11A, which is associated with link A and to link B diode switch 11B. Similarly, line circuit 12 terminates in diode switches 12A and 12B. Thus, each link will have 100 diode switches corresponding to the 100 line circuits of the group associated with it.

The 100 diode switches associated with each link are connected to individual windings of a speech transmission transformer which comprises link multiple point 13A. The link multiple point serves to tie all of the diode switches, associated with that particular link, together so that the talking circuit can be completed between any two selected diode switches. Link repeater 20A, which may be a shunt type negative impedance amplifier, is connected across one winding of the speech transmission transformer and serves to amplify and repeat speech currents between the selected lines. It also serves as an insertion point for supervisory tones, such as dial tone and busy tone, which are necessary in any high quality telephone system. The tones-out conductor is shown connected from connector 18A to link repeater 20A for this purpose.

The common equipment, which is shown as lumped in block 27, comprises the pulse generating, ringing, and tone generating circuits for the system. The purpose of the pulse generating circuits of the common equipment is to set up the 100 channel pulse multiplex timing frame and to transmit suitable timing pulses to the various switching components in accordance with the basic multiplex frame. A frame is defined as the time period required for the multiplexing circuits to scan all of the 100 lines of the system. In the disclosed arrangement, the time period is 1000 microseconds, corresponding to a scanning frequency of 1000 C. P. S. The frame is divided into 100 10-microsecond intervals, each of which is allotted to one of the 100 lines of the system. Through the action of a 100 kc. master oscillator and two ten stage ring circuits pulses are generated which define the individual time channels and the frame as a whole. The units ring circuit is stepped at the frequency of the master oscillator and produces units pulses on ten positive output conductors and ten negative output conductors. The tens ring is stepped from the last stage of the units ring and produces tens pulses on ten positive output conductors and ten negative output conductors.

Each positive and negative tens conductor carries impulses of 100 microseconds duration at a frequency of 1 kc. The positive and negative tens pulses are employed to gate the positive and negative units pulses respectively throughout the system. Thus, the first ten pulse time positions of each pulse frame which are respectively assigned to the lines of the system having directory number designations 11, 12—10, are defined by the first tens pulse period of the frame within which the first ten unit pulse periods occur. Similarly, the second group of ten pulse time positions of each pulse frame, which are respectively assigned to the lines of the system having directory number designations 21, 22—20, are defined by the second tens pulse period of the frame within which the second group of unit pulse periods occur, etc.

The purpose of the channel pulse matrix 26 is to commutate to 100 output conductors pulses in the individual time positions assigned to each of the 100 lines in each group of lines in response to pulses on the 20 input conductors comprising the negative tens and negative units pulses. The matrix is made up of 100 identical "and" gates composed of two diodes each. An "and" gate is defined as a logic gate in which an output is realized only when a predetermined type of signal is connected to all inputs simultaneously. When a tens pulse and a unit pulse occur simultaneously, an output is realized from one of the "and" gates. For any one gate this simultaneous occurrence exists during one of the 10 microsecond channel intervals and repeats once each frame.

The output of the channel pulse matrix is coupled to the diode switches and to the line circuits of the system. It can be seen from the trunking diagram that conductor CP11, which carries pulses in time position 11, is connected to line circuit 11 and to diode switches 11A and 11B. Similarly, conductor CP12, which carries pulses in time position 12, is connected to line circuit 12 and to diode switches 12A and 12B. Each diode switch is thus conditioned in accordance with the time position identity of the line to which it is connected so that it will respond only to switch control pulses appearing in the time position of its associated line. In a similar manner, the ringing control facilities in each line circuit is conditioned in accordance with the time position of its associated line so that ringing control pulses will act to operate the proper line circuit in accordance with the relative timing of the pulses.

The purpose of the multiplexer 24 is to commutate the 100 supervisory signals received over the multiplexer control conductors, such as M11 and M12 of line circuits 11 and 12, respectively, from the 100 line circuits in such a way that each line is sampled at a precise predetermined time occurring once during the 1000 microsecond frame. During the channel interval, which corresponds to a unit pulse having a duration of 10 microseconds, a short sample of the supervisory information is taken in such a way that if the line is on-hook, no output signal is derived, and if line current is flowing, a full amplitude output signal in the form of a 2 microsecond pulse occurring at the center of the channel pulse interval is derived. The individual channel interval for each line is, of course, derived from the gating of units pulses with tens pulses in the same manner as described in conjunction with the channel pulse matrix circuit. The channel pulse interval for any particular line is further gated by the multiplexer control conductor, such as M11, from that particular line circuit and by a narrow sampling pulse generated in the common equipment. The samples from all of the lines are combined in the multiplexer and appear on a single output conductor which is connected to the multiplexer amplifier 25. The pulses are amplified and inverted by the multiplexer amplifier 25 and distributed to all of the line finders and connectors of the link group and to the link allotter circuit 19 over conductor MPX.

It is believed that the remaining components of the system, namely, the line finder, the connector, and certain portions of the link equipment and line circuit may best be generally described by tracing a call through the system. For this purpose, assume that station 211 is calling station 912 and that link A has been preselected by allotter 19. It is to be noted that the first digit of the station number identifies the type of ringing to be applied to the line to ring that station as fully described in the above identified patent.

When the subscriber at station 211 removes the handset from its cradle, a loop circuit is completed over conductors T and R to seize line circuit 11. In response to this seizure, line circuit 11 functions to alter the potential on conductor M11, which is connected to multiplexer 24, in such manner that the multiplexer functions to produce a multiplexer pulse in the time position of line circuit 11. As previously explained, this pulse is amplified by a multiplexer amplifier 25 and connected over conductor MPX to the switching components of the system.

Line finder 17A seizes the calling line time position by generating a gating pulse in the same time position as the calling line multiplexer pulse. This pulse is applied to conductor LG and is then amplified in switch control circuit 16A and transmitted over switch control conductor SC to all of the diode switch circuits associated with link A. The pulses on conductor SC comprise the amplified pulse in time position 11, derived from conductor LG, gated with the very narrow sampling pulse generated by the common equipment. Although conductor SC is multipled to all of the diode switches, only the one switch corresponding to the calling line is operated. The SC pulse is applied to one input of a two input "and" gate in each of the diode switch circuits. The other input is connected to the channel pulse matrix circuit 26 by individual conductors, such as CP11 and CP12, which correspond to lines 11 and 12, respectively. Thus, only diode switch 11A will respond since the pulses on conductor SC are in the same time position as those on conductor CP11. Diode switch 11A is thus rendered conductive and serves to cut through line circuit 11 and thus station 211 to the link multiple point 13A. The calling subscriber now hears dial tone which originates in the common equipment and is connected to the connector circuit where it is gated to the tones-out conductor while the connector is in the reset condition.

Connector 18A, which is associated with line finder 17A, is then controlled by dial pulses appearing in the time position of the calling line to select the desired called line. If the called line is idle, the connector functions to generate a gating pulse in the time position of the called line. The gating pulse is applied to conductor LG, amplified by switch control circuit 16A, and transmitted over switch control conductor SC to the diode switches associated with link A. Since it was assumed that line circuit 12 is the called line circuit, the connector gating pulse on conductor SC corresponds in time position to the pulse on conductor CP12 and thus diode switch 12A is rendered conductive. A talking or communication connection is now completed from the calling line circuit to the called line circuit by way of diode switch 11A, multiple point 13A, link repeater 20A, and diode switch 12A. The called line is now rung in a manner fully described in the above identified patent.

The diode switches are designed in such a way that they will lock up in response to an applied short pulse. Thus, through time division multiplexing principles it is possible to provide a single control conductor, SC, for all of the diode switches associated with each link to which is applied short pulses originating in the line finder-connector link. In setting up a call through the system, two pulses are applied during each time division frame to this switch control conductor. As previously mentioned, one of these pulses is generated in a line finder and serves to operate the diode switch associated with the calling line, and the other pulse is generated in the connector circuit and serves to operate the diode switch associated with the called line.

When the calling party hangs up at the termination of the call, multiplexer pulses in time position 11 disappear for an interval of time great enough to allow the finder-connector link to release. When line finder 17A releases, a control potential is applied to conductor AS to render the release pulse generator 15A operative to generate release pulses which are amplified by release pulse amplifier 14A and transmitted over the release pulse conductor RP to diode switches associated with link A and to connector 18A. The release pulses serve to restore the diode switches to their non-conductive condition and to restore the digit registers in connector 18A to their reset condition.

DETAILED DESCRIPTION

*Line circuit 11*

Only the portion of line circuit 11 concerned with the talking path has been shown in detail in Figure 3. It can be seen that the line circuit comprises a transformer T300, which serves the function of coupling voice currents through to the diode switch circuits associated with line circuit 11. The transformer has two primary windings, 301 and 302, and a single center tapped secondary winding 303. The secondary winding is multiply connected to the diode switches associated with line circuit 11 and with each link of the system.

Assume that a station associated with line circuit 11 goes off hook. Line current flows over the extended loop circuit from +24 volts through supervisory resistor R305, winding 301 of T300, the parallel combination of crystal diode CD301 and resistor R303, resistor R301, over the tip conductor, through the station subset and back to the ring conductor, through resistor R302, the parallel combination of crystal diode CD302 and resistor R304 and through winding 302 of transformer T300 to −24 volts. The diffused junction germanium diodes CD301 and CD302, which may be type IN–93, are poled so as to conduct. It is to be noted that when the station on the line is on-hook there is no voltage drop across supervisory resistor R305 so that conductor M11, which connects to multiplexer 24, stands at +24 volts. Because of the line current flow when a station is off-hook, a voltage drop exists across resistor R305 and the potential of conductor M11 drops to +18 volts or less depending upon the length of the extended loop. This reduced voltage level serves to indicate to the multiplexer that line 11 is off-hook. Dial impulses generated at the subset will be reproduced on conductor M11 as the current flow through resistor R305 is interrupted and reestablished and the corresponding voltage drop across said resistor disappears and reappears, respectively.

Talking signals appear across the primary windings of transformer T300 and are induced in the secondary winding 303. Capacitor C301 by-passes the supervisory resistor R305 to voice frequencies but permits dial impulses to appear across the resistor and hence on conductor M11. On short loops where dial transients might become severe, current limiting resistors, such as R301 and R302, are placed in series with the tip and ring conductors of the line.

The ringing facilities of the line circuit has been omitted since it forms no part of the present invention. It might be well to mention, however, that the ringing voltage applied to the tip conductor when line circuit 11 is called is of such polarity that diode CD301 is rendered non-conductive so as to isolate the ringing voltage from the source of battery feed. A portion of the ringing voltage is coupled through resistor R303 and winding 301 so that the calling party is given a ringback tone signal. Similarly, the ringing voltage applied to the ring conductor is also of a polarity such that diode CD302 is rendered non-conductive. Resistors R308 and R309 are employed in the circuit to bleed off the accumulated charge built up across the ringer capacitor located in series with the ringer at each substation telephone. The ringing power being applied through rectifying gas tubes contains a large D.-C. component which must be bled off for satisfactory ringing operation. Resistors R308 and R309 are sufficiently large that they present negligible shunting of audio frequencies during conversation periods.

*Diode switch 11A*

Figure 4 shows the details of diode switch circuit 11A, which is the diode switch associated with line circuit 11 and link A. It will be remembered that each line circuit has a diode switch associated with each link and that each link therefore has 100 diode switches, one for each line of the 100 line system, associated with it. The diode switch circuits for the other lines of the system are identical, circuitwise, to circuit 11A.

The diode switch comprises line connecting means which is arranged to normally block current flow between the associated line and the link speech transmission transformer winding individual to that line. In the disclosed arrangement, the line connecting means comprises a pair of silicon junction diodes CD401 and CD402, which may be type IN–137A, and which are connected in a balanced configuration. The diodes are rendered either conductive or nonconductive by a control means. As disclosed, the control means is the point contact bi-stable diode switch control transistor 400 which applies biasing potential to the diodes over the center tap of winding 411 on transformer T410. When transistor 400 is non-conducting, a negative signal of approximately 15 volts is applied to the diodes in the non-conducting direction. The cathode terminals of diodes CD401 and CD402 are held at approximately −6 volts as determined by the simple bleeder circuit comprising resistors R306 and R307 connected to the center tap of secondary winding 303 of the line circuit transformer T300. The anode terminals of diodes CD401 and CD402 are held at approximately −21 volts as determined by the voltage drop in resistor R402 from −25.5 volts caused by the small current flow from collector to base of transistor 400 in the non-conducting condition. When transistor 400 is conductive, its collector potential raises to approximately ground potential and a D.-C. current flow of approximately 2.5 milliamperes per diode is achieved. The D.-C. bias is sufficient to allow the A.-C. talking signals to pass without distortion. In other words, the A.-C. signals do not exceed an amplitude of 2.5 milliamperes. It should be obvious that talking signals appearing in secondary winding 303 of transformer T300 are blocked when the diodes are in their non-conducting state and are allowed to pass through with virtually no attenuation when the diodes are rendered conductive.

Transistor 400, which may be type G11A, is bi-stable in operation and hence can be turned on or off with the application of short pulses. The emitter is returned to the release pulse conductor RP which is multiplied to all of the other diode switch circuits associated with link A. When link A is engaged in a call, conductor RP stands at ground potential. When the link is idle, a series of short negative pulses are impressed on conductor RP by the release pulse generator 15A. These pulses serve to render any and all conducting transistors associated with link A non-conducting for reasons that will become apparent as the description proceeds.

It will be remembered that when link A seizes a calling line, the release pulses are terminated and the line finder transmits a gating pulse in the time position of the calling line to switch control circuit 16A. Circuit 16A then functions to amplify the pulse and release it over conductor SC to all of the diode switches associated with link A. The pulse on conductor SC is impressed on one input of an "and" gate, which comprises diodes CD403 and CD404. The output of this gate is coupled through resistor R403 to the base of transistor 400. Channel pulses from the channel pulse matrix 26 are continuously applied to the other input of the "and" gate. For line 11, channel gate pulses in time position 11 are applied to the "and" gate terminals of all diode switches associated with that line, whereas switch control pulses on conductor SC are applied to the "and" gate terminals of all diode switches associated with link A. When a switch control pulse appears in time position 11, the combination of this pulse and the channel pulse in the same time position gives rise to an output which acts to trigger the bi-stable transistor to its on condition.

Figure 6:
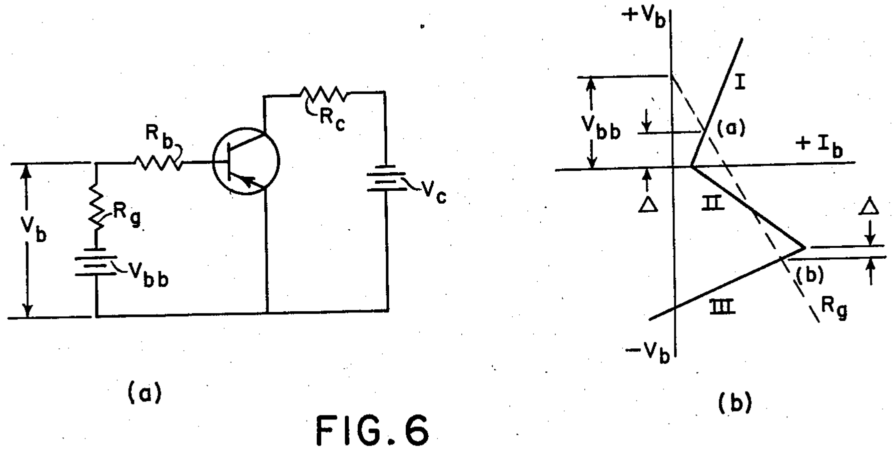
Fig. 6 shows the characteristic curves of certain transistor circuits used in the system.

Conductor SC stands at +6 volts except when a negative switch control pulse is applied thereto. Conductor CP11 is also maintained at +6 volts except during the negative pulse in time position 11. Thus, diodes CD403 and CD404 are normally conductive from +6 volts through the base and collector of transistor 400 to −25.5 volts. As previously mentioned, base current flows in point contact transistor 400 even though the transistor is in the non-conductive condition with the emitter cut off. A negative pulse appearing on conductor SC in any time position other than during the time of channel pulse 11 merely serves to cut off diode CD404 since its cathode remains at +6 volts because of the conduction through diode CD403. However, when the time position of the negative pulse on conductor SC coincides with the negative channel pulse, diodes CD403 and CD404 are rendered non-conductive and transistor 400 shifts to its conductive condition. The operation of transistor 400 is graphically illustrated in Figure 6 of the drawings. Figure 6B shows the base bi-stable characteristic and Figure 6A shows the circuit used to obtain the characteristic.

It can be seen that the load line $R_g$ has three intersections with the base characteristic curve. As is well known, the intersection with the characteristic in region II is unstable whereas those in regions I and III are stable. If it be assumed that the transistor is in the non-conducting condition, the circuit is at operating point *a*. It can be seen that there is substantial base current flow in the non-conducting condition. When the base supply voltage approaches zero, the load line moves downward and the assumed operating point *a* moves downward along the region I portion of the characteristic. At the turning point of the characteristic, the operating point suddenly flips to the high current region, returning to point *b* as the base voltage is returned to its original value. It can be seen that a positive pulse would be required to shift the operating point from point *b* to point *a*. Since conductor SC carries only negative pulses, the base circuit of transistor 400 loses control and transistor 400 remains conductive until turned off at the termination of the call by the application of release pulses to conductor RP. A negative pulse applied to the emitter is, of course, the same as applying a positive pulse to the base electrode.

The operation when line circuit 11 is the selected called line is exactly as described above. The connector 18A controls the switch control circuit 16A, which releases pulses in the time position of line 11 over conductor SC to trigger diode switch control resistor 400 to the conductive condition.

*Link multiple point 13A*

It can be seen that the link multiple point comprises transformer T410 having individual center tapped windings, such as 411—414, for each line of the 100 line group. The transformer also has a winding 415 which is connected to link repeater 20A.

*Link repeater 20A*

The purpose of this circuit, which is shown in Fig. 5, is to amplify and repeat speech currents between the calling and called lines and also to serve as an insertion point for supervisory tones, such as dial tone and busy tone, which are transmitted to the calling line. The repeater comprises a two-stage class A junction transistor amplifier, which is connected so as to produce a stable negative impedance across winding 415 of the speech transmission transformer T410. The two NPN junction transistors 500 and 510 used in the circuit may be type TI–201. Transistor 500 is normally biased for conduction since its base is positive with respect to its emitter which is returned through resistor R503 to ground potential. Base bias is derived from the voltage division across resistors R501 and R502, which are connected between +16.5 volts and ground potential. Transistor 510 is also normally biased for conduction since its base is positive with respect to its emitter which is returned to ground potential through resistor R507. Base bias for transistor 510 is derived from the voltage division across resistors R505 and R506 which are connected between the collector of transistor 500 and ground.

Speech current induced in winding 415 is coupled to the base of transistor 500 through resistor R508 and capacitor C501. Negative feedback is applied from the collector of transistor 510 to the emitter of transistor 500 through resistors R509 and R510 and capacitor C502 to prevent the amplifier from singing. Resistor R509 is a gain control which is provided to adjust the overall gain of the amplifier and thus control the magnitude of the negative impedance. Positive feedback is applied from the collector of transistor 510 to the input through impedance Z. As is well known in the art, the impedance seen looking into the repeater is the negative of impedance Z. Preferably impedance Z comprises both resistance and inductance so as to balance out the insertion loss of transformer T410 in the system.

Dial tone and busy tone, appearing on conductor tones-out from connector 18A, are coupled through capacitor C503 and resistor R511 to the base of transistor 510, are amplified in transistor 510 and coupled to the calling line by transformer T410.

While there has been shown and described what is at present considered to be the preferred embodiment of the invention, modifications thereto will readily occur to those skilled in the art. It is, therefore, desired that the invention not be limited to the system shown and described and it is intended to cover in the appended claims all such modifications as fall within the true spirit and scope of the invention.

What is claimed is:

1. In a telephone system, a plurality of lines, a link, a speech transmission transformer associated with said link, said transformer having individual windings for each of said lines, means including at least one unidirectional conducting device for connecting each line to one of said transformer windings, and means including said link for selectively rendering conductive the unidirectional conducting devices connected to calling and called ones of said lines, thereby to permit speech transmission between said calling and called lines through said selected unidirectional conducting devices and said speech transmission transformer.

2. In a telephone system, a plurality of lines, a link, a speech transmission transformer associated with said link, said transformer having a plurality of windings including individual windings for each of said lines, means including at least one unidirectional conducting device for connecting each line to one of said transformer windings, means including said link for selectively rendering conductive the unidirectional conducting devices connected to calling and called ones of said lines, and means connected to one of said windings for amplifying and repeating speech current in both directions between the calling and called lines.

3. The telephone system of claim 2 in which the last mentioned means is a negative impedance repeater.

4. In a telephone system, a plurality of lines having individually assigned thereto different time positions which recur in repetitive time position frames, a speech transmission transformer common to said lines, said transformer having individual windings for each of said lines, means including at least one undirectional conducting device for connecting each line to one of said transformer windings, and time position responsive control means for selectively rendering conductive the unidirectional conducting devices connected to calling and called ones of said lines, thereby to permit speech transmission between said calling and called lines through said selected unidirectional conducting devices and said speech transmission transformer.

5. In a telephone system, a plurality of lines having individually assigned thereto different time positions which recur in repetitive time position frames, a speech transmission transformer common to said lines, said transformer having a plurality of windings including individual windings for each of said lines, means including at least one undirectional conducting device for connecting each line to one of said transformer windings, time position responsive control means for selectively rendering conductive the unidirectional conducting devices connected to calling and called ones of said lines, and means connected to one of said windings for amplifying and repeating speech current in both directions between the calling and called lines.

6. The telephone system of claim 5 in which the last mentioned means is a negative impedance repeater.

7. In a telephone system, a plurality of lines, a link, a speech transmission transformer associated with said link, said transformer having individual windings for each of said lines, a plurality of line connecting means individually associated with each of said lines, each line connecting means being interposed in a connection between its associated line and one of said transformer windings and arranged to normally prevent current flow between the line and the transformer winding, and means including said link for selectively controlling the line connecting means associated with calling and called ones of said lines to permit current flow between the calling line and its associated winding and between the called line and its associated winding respectively, thereby to permit speech transmission between said calling and called lines through said speech transmission transformer.

8. In a telephone system, a plurality of lines, a link, a speech transmission transformer associated with said link, said transformer having a plurality of windings including individual windings for each of said lines, a plurality of line connecting means individually associated with each of said lines, each line connecting means being interposed in a connection between its associated line and one of said transformer windings and arranged to normally prevent current flow between the line and the transformer winding, means including said link for selectively controlling the line connecting means associated with calling and called ones of said lines to permit current flow between the calling line and its associated winding and between the called line and its associated winding respectively, and means connected to one of said windings for amplifying and repeating speech current in both directions between the calling and called lines.

9. The telephone system of claim 8 in which the last mentioned means is a negative impedance repeater.

10. In a telephone system, a plurality of lines having individually assigned thereto different time positions which recur in repetitive time position frames, a speech transmission transformer common to said lines, said transformer having individual windings for each of said lines, a plurality of line connecting means individually associated with each of said lines, each line connecting means being interposed in a connection between its associated line and one of said transformer windings and arranged to normally prevent current flow between the line and the transformer winding, and time position responsive control means for selectively controlling the line connecting means associated with calling and called ones of said lines to permit current flow between the calling line and its associated winding and between the called line and its associated winding respectively, thereby to permit speech transmission between said calling and called lines through said speech transmission transformer.

11. In a telephone system, a plurality of lines having individually assigned thereto different time positions which recur in repetitive time position frames, a speech transmission transformer common to said lines, said transformer having a plurality of windings including individual windings for each of said lines, a plurality of line connecting means individually associated with each of said lines, each line connecting means being interposed in a connection between its associated line and one of said transformer windings and arranged to normally prevent current flow between the line and the transformer winding, time position responsive control means for selectively controlling the line connecting means associated with calling and called ones of said lines to permit current flow between the calling line and its associated winding and between the called line and its associated winding respectively, and means connected to one of said windings for amplifying and repeating speech current in both directions between the calling and called lines.

12. The telephone system of claim 11 in which the last mentioned means is a negative impedance repeater.

References Cited in the file of this patent

UNITED STATES PATENTS

| | | |
|---|---|---|
| 2,379,221 | Espenchied | June 21, 1945 |
| 2,485,748 | Kucera | Oct. 25, 1949 |
| 2,619,548 | Lesti | Nov. 25, 1952 |
| 2,691,151 | Toulon | Oct. 5, 1954 |